United States Patent [19]

Sato

[11] Patent Number: 5,322,239
[45] Date of Patent: Jun. 21, 1994

[54] BAITCASTING REEL HAVING A CLUTCH CONTROL MECHANISM

[75] Inventor: Jun Sato, Sakai, Japan
[73] Assignee: Shimano Inc., Osaka, Japan
[21] Appl. No.: 941,938
[22] Filed: Sep. 8, 1992
[30] Foreign Application Priority Data Sep. 17, 1991 [JP] Japan ................... 3-235828

[51] Int. Cl.⁵ .................................. A01K 89/015
[52] U.S. Cl. ................................................ 242/261
[58] Field of Search ................ 242/259, 260, 261, 262

[56] References Cited

U.S. PATENT DOCUMENTS

| | | | |
|---|---|---|---|
| 4,379,530 | 4/1983 | Kobayashi | 242/261 |
| 4,709,874 | 12/1987 | Murakami | 242/261 |
| 4,798,355 | 1/1989 | Kaneko | 242/261 |
| 4,850,550 | 7/1989 | Aoki | 242/261 |
| 5,158,245 | 10/1992 | Johansson | 242/261 |

FOREIGN PATENT DOCUMENTS 62-181169 11/1987 Japan .

*Primary Examiner*—Daniel P. Stodola
*Assistant Examiner*—Michael R. Mansen
*Attorney, Agent, or Firm*—Dickstein, Shapiro & Morin

[57] ABSTRACT

A baitcasting reel has a clutch mechanism mounted in a transmission line between a handle and a spool, an annular cam for operating the clutch mechanism, and a rotary member interlocked to the handle. The annular cam includes a return piece movable to a position to interfere with projections formed on the rotary member when the annular cam is operated to a clutch disengaging position. The return piece transmits a pressing force from the rotary member to the annular cam when the handle is turned in a line winding direction, to engage the clutch mechanism. A guide member guides the return piece to a predetermined position while preventing contact between the return piece and the projections of the rotary member, and thereafter allows the return piece to move radially of the rotary member to the interference position. This guide member is movable in contact with the return piece when the handle is turned in the line winding direction.

5 Claims, 4 Drawing Sheets

BAITCASTING REEL HAVING A CLUTCH CONTROL MECHANISM

BACKGROUND OF THE INVENTION

1. Field of the Invention

This invention relates to baitcasting reels, and more particularly to a baitcasting reel having a control mechanism for operating a clutch mechanism mounted in a transmission line between a handle and a spool, and a rotary member mounted in a transmission line interlocked to the handle, the control mechanism including a return piece movable to an interference position inside a locus of revolution of projections formed on the rotary member when the control mechanism is operated to a clutch disengaging position, the return piece being operable to transmit a pressing force from the projections to the control mechanism to engage the clutch mechanism when the handle is turned in a line winding direction.

2. Description of the Related Art

A baitcasting reel having the above construction is disclosed in Japanese Utility Model Publication Kokai No. 1987-181169, for example. In the prior construction, the control mechanism comprises a slide type plate having a return piece pivoted to an end thereof, and the rotary member comprises a ratchet wheel mounted on a handle shaft. During an operation to disengage the clutch mechanism, the return piece is switched to a position for moving into a locus of revolution of teeth (projections) formed on the ratchet wheel. When the handle is turned in the line winding direction with the clutch mechanism disengaged, the return piece transmits an operating force from the teeth of the ratchet wheel to the plate, thereby to move the plate to a clutch engaging position.

During the operation to disengage the clutch mechanism, the return piece pivotally attached to the plate is switched to a position for swinging radially of the rachet wheel into the locus of revolution of the teeth of the ratchet wheel. Consequently, this reel has the advantage of avoiding the inconvenience of the return piece contacting the teeth in the course of an operation to disengage the clutch mechanism.

According to this prior construction, during the operation to disengage the clutch mechanism, the plate is moved in a direction to rotate the ratchet wheel backward, with the return piece erected. This change in the position of the return piece occurring during the operation to disengage the clutch mechanism includes a component of force to dis... .e the return piece axially of the ratchet wheel, and a component of the force to move the return piece in the direction to rotate the ratchet wheel backward. If, for example, an end of the return piece contacts a front surface of a tooth (the surface in the direction of forward rotation of the ratchet wheel) in the course of an operation to disengage the clutch mechanism, the clutch mechanism cannot be disengaged because of the component of force acting in the direction of backward rotation.

This phenomenon seldom occurs where the ratchet wheel has a large amount of play. However, this inconvenience is frequently encountered where, as in modern reels, a roller type mechanism allowing little backward play is used for preventing backward turning of the handle. Thus, there is room for improvement.

When the return piece contacts an outer periphery of a tooth of the ratchet wheel during the operation to disengage the clutch mechanism, it is possible to disengage the clutch mechanism by turning the handle in the line winding direction. However, when the return piece contacts a front surface of a tooth as noted above, the handle cannot be turned in the line winding direction. A suitable improvement in this aspect is desired.

SUMMARY OF THE INVENTION

An object of the present invention is to provide an improved baitcasting reel for allowing the return piece, during an operation to disengage the clutch mechanism, to be set to a position to interfere with the projections of the rotary member reliably, without disabling a handle operation, even where a roller type mechanism allowing little backward play is used for preventing backward turning of the handle.

The above object is fulfilled, according to the present invention, by a baitcasting reel having a control mechanism for operating a clutch mechanism and including a return piece, and a rotary member mounted in a transmission line interlocked to a handle, the return piece being operable to transmit a pressing force from projections of the rotary member to the control mechanism to engage the clutch mechanism when the handle is turned in a line winding direction, as noted in the outset hereof, wherein a guide member is provided which is operable, when the clutch mechanism is being disengaged, for guiding the return piece to a predetermined position while preventing contact between an end of the return piece and the projections of the rotary member, and thereafter allowing the end of the return piece to move radially of the rotary member to an interference position, the guide member having a movable construction for moving in contact with the return piece when the handle is turned in the line winding direction.

This construction has the following functions and effects. The above features may be arranged as shown in FIGS. 1 through 3, for example. When disengaging a clutch mechanism C, a return piece 32 moves along a guide member 33 with displacement of a control mechanism 28. An end of the return piece 32 in its movement will not contact projections 17A of a rotary member 17. Upon reaching a predetermined position, the return piece 32 is freed from guiding action of the guide member 33 whereby the return piece 32 moves radially inwardly of the rotary member 17. Thus, the return piece 32 is allowed to move into a locus of revolution of the projections 17A of the rotary member 17.

When a handle 8 is turned in a line winding direction after the return piece 32 is switched as described above, the guide member 33, even if lying in a position to interfere with the return piece 32 as shown in FIG. 2, moves with the return piece 32. Consequently, the clutch mechanism C is engaged smoothly without any obstructive force applied to clutch engaging action.

Thus, according to the present invention, the return piece 32, unlike the pivotable type that makes a simple movement, moves tangentially of the rotary member 17 without contacting the projections 17A, and upon reaching an appropriate position moves radially of the rotary member 17. Even where the projections 17A are formed in a gear-like way peripherally of the rotary member 17, there is little possibility of the return piece 32 contacting front surfaces of the projections 17A (the surfaces in the direction of forward rotation of the rotary member). Further, the clutch mechanism C is disengaged without any significant obstruction even if a mechanism allowing little backward play is used to prevent backward turning of the handle 8. Since the guide member 33 is the movable type, the clutch mechanism C is engageable smoothly even if the return piece 32 and guide member 33 are in mutually interfering positions.

According to the above construction, the return piece 32 may contact outer peripheries of the projections 17A of the rotary member 17 as in the prior art. When this phenomenon takes place, the handle 8 may be turned in the line winding direction as in the prior art, to readily allow the end of the return piece 32 to move into the locus of revolution of the projections 17A.

Thus, the present invention provides an improved baitcasting reel for allowing the return piece, during an operation to disengage the clutch mechanism, to be set to a position to interfere with the projections of the rotary member reliably, without disabling a handle operation, even where a roller type mechanism allowing little backward play is used for preventing backward turning of the handle.

The foregoing and other objects, features and advantages of the invention will be apparent from the following more particular description of preferred embodiments of the invention, as illustrated in the accompanying drawings.

DETAILED DESCRIPTION OF THE PREFERRED EMBODIMENT

A baitcasting reel according to the present invention will be described in detail with reference to the drawings.

Figure 4:
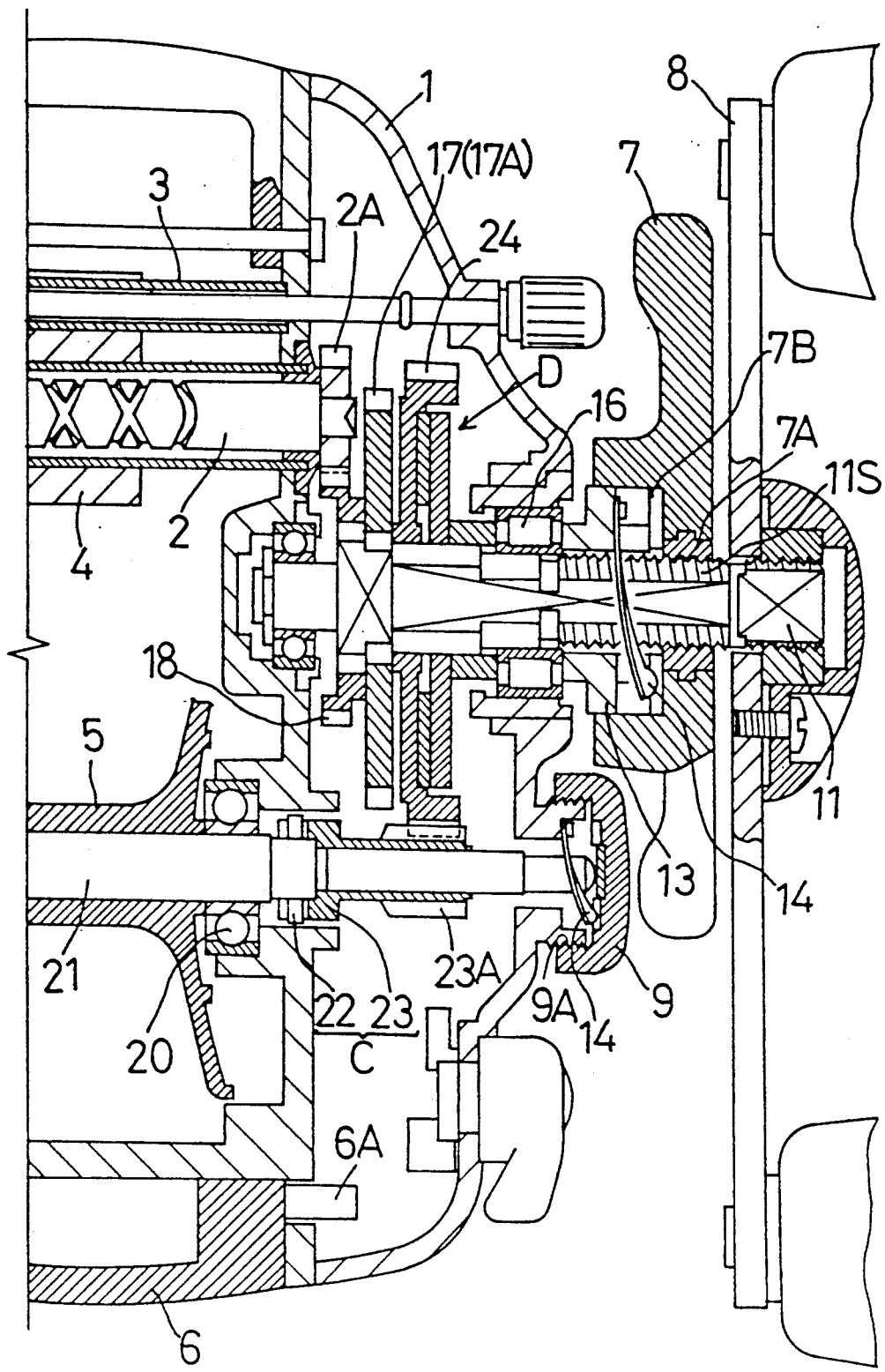
FIG. 4 is a sectional view of a right half of a fishing reel.
Figure 5:
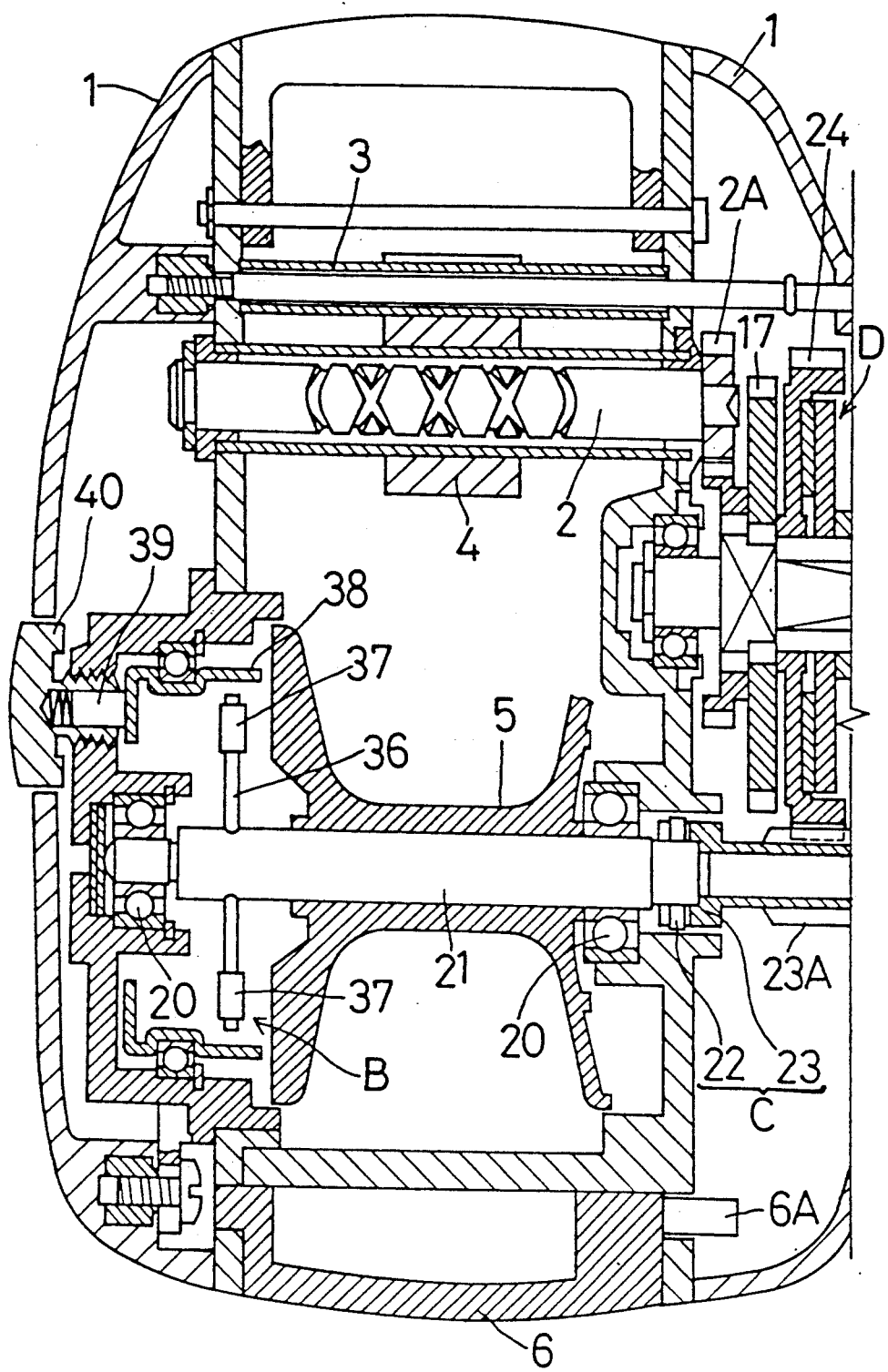
FIG. 5 is a sectional view of a left half of the fishing reel.

As shown in FIGS. 4 and 5, the baitcasting reel comprises right and left side cases 1 constituting a reel body, and a level wind mechanism mounted between the two side cases 1. The level wind mechanism includes a screw shaft 2, and a line guide 4 reciprocable right and left along a guide rod 3 with rotation of the screw shaft 2. Further, the reel body has a spool 5 for winding a fishing line (not shown), and a clutch controller 6. The right side case 1 supports a drag controller 7, a handle 8, a cast controller 9, all disposed outwardly of the right side case 1. The left side case 1 contains a brake mechanism B.

The right side case 1 rotatably supports a handle shaft 11 connected to the handle 8. The drag controller 7 includes a nut 7A meshed with a screw portion 11S of the handle shaft 11, and a plurality of teeth 7B for producing a sound. A sleeve 13 is mounted on the handle shaft 11 to receive torque therefrom. The sleeve 13 supports an arcuate sound producing piece 14 formed of a leaf spring. When the drag controller 7 is turned, a pressing force is transmitted from the sleeve 13 to a drag mechanism D through a roller type one-way clutch 16, with an end of the sound producing piece 14 flipping on the teeth 7B to produce a clicking sound.

The handle shaft 11 supports the drag mechanism D, a rotary member 17 defining a plurality of gear-like projections 17A, and a transmission gear 18. The one-way clutch 16 prevents backward turning of the handle 18. The transmission gear 18 is meshed with an input gear 2A mounted on the screw shaft 2 for driving the level wind mechanism.

The spool 5 is rotatable with a spool shaft 21 supported by ball bearings 20. The spool shaft 21 has an engaging pin 22 attached to an intermediate position thereof, and a clutch sleeve 23 slidably mounted thereon to be engageable with the pin 22. The clutch sleeve 23 has an input gear 23A meshed with an output gear 24 of the drag mechanism D.

The engaging pin 22 and clutch sleeve 23 constitute a clutch mechanism C. When the handle 8 is turned with the clutch sleeve 23 engaged with the pin 22, the spool 5 is rotated to wind the fishing line thereon.

Figure 1:
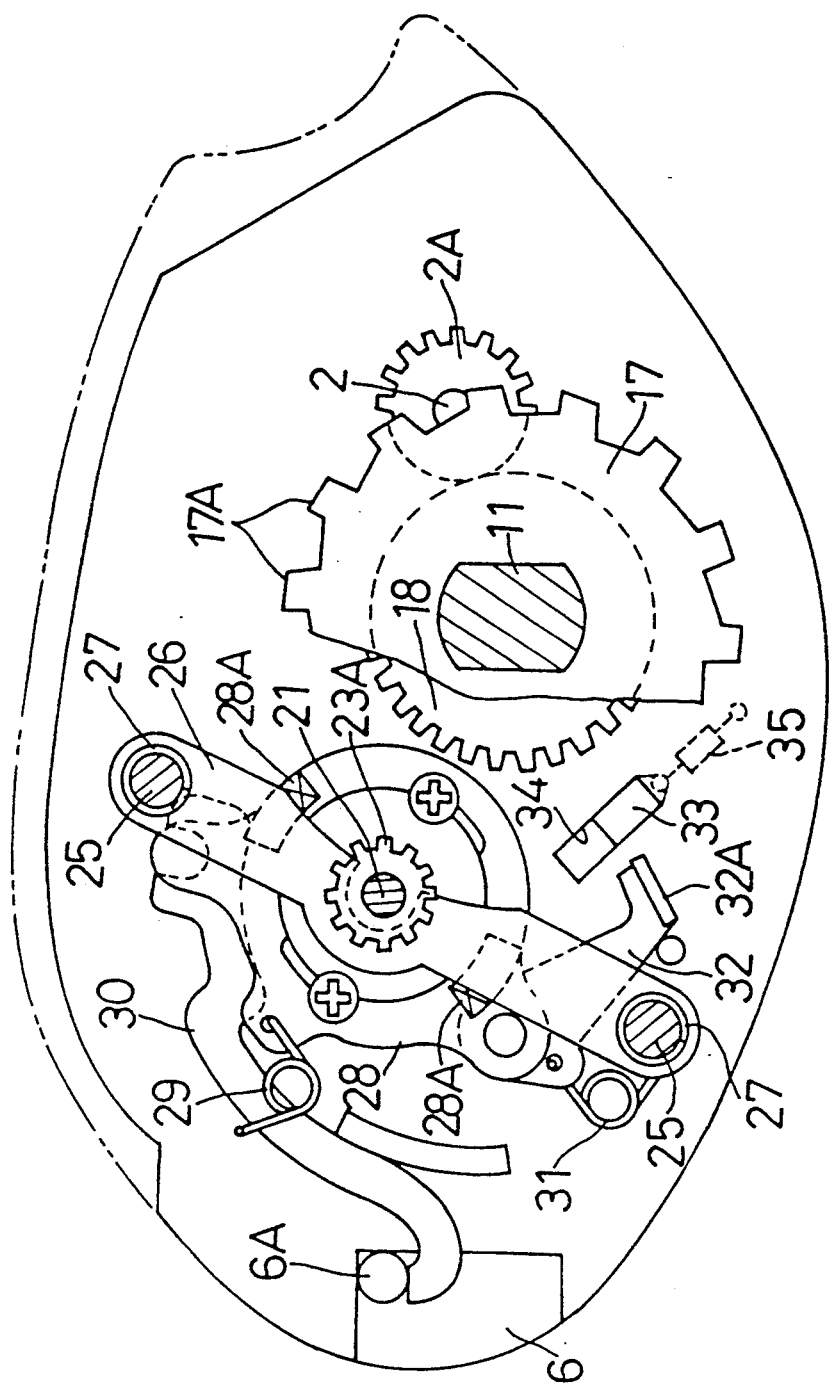
FIG. 1 is a side view of a clutch control system according to the present invention.
Figure 2:
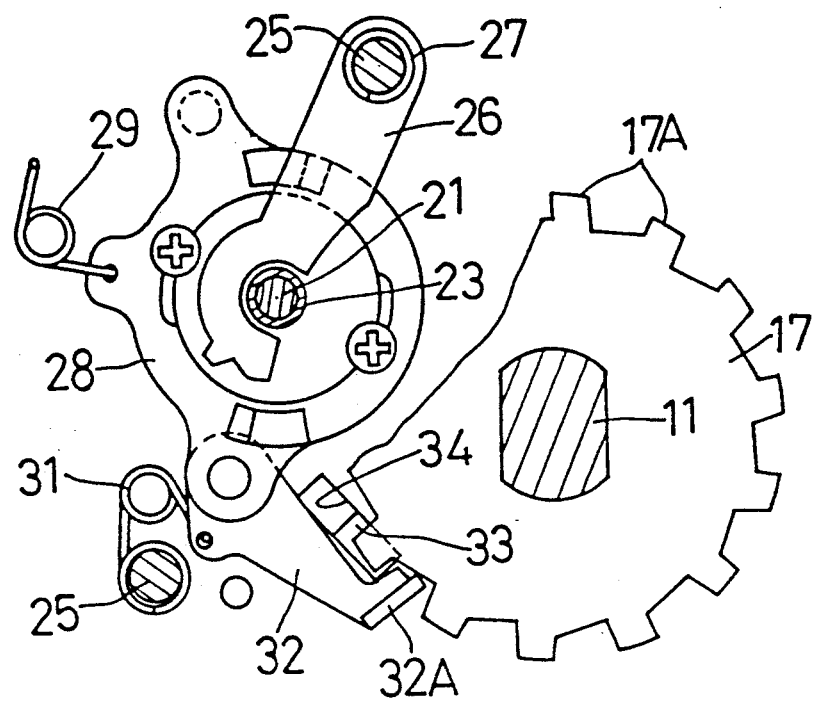
FIG. 2 is a side view of the clutch control system in a declutching state.

As shown in FIGS. 1 and 2, the clutch sleeve 23 is engaged with a yoke 26 slidably supported on a pair of support shafts 25. Coil springs 27 are mounted on the support shafts 25 to operate the yoke 26 to a clutch engaging position.

An annular cam 28 (one example of control mechanisms) is rotatably and coaxially mounted on the spool shaft 21. The annular cam 28 has a pair of cam surfaces 28A. A first toggle spring 29 acts on the annular cam 28 to set the annular cam 28 to a position to engage the clutch mechanism C and to a position to disengage the clutch mechanism C. An approximately bow-shaped control member 30 extends between the annular cam 28 and a contact pin 6A projecting from the clutch controller 6. Further, the annular cam 28 pivotally supports an arm-like return piece 32 on which a second toggle spring 31 acts. A guide member 33 is provided for preventing the return piece 32 from contacting the projections 17A of the rotary member 17 in the course of an operation to disengage the clutch mechanism C. After the clutch mechanism C has been disengaged, the guide member 33 is movable with the return piece 32 when the handle 8 is turned in a line winding direction.

Figure 3:
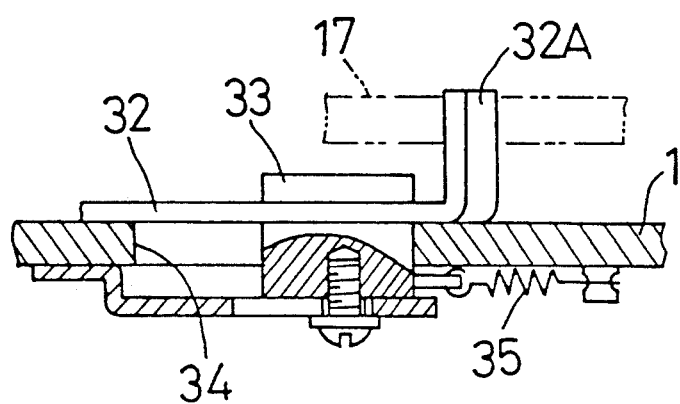
FIG. 3 is a sectional view of a guide member and adjacent components.

As shown in FIG. 3, the guide member 33 is movable along a slot 34 formed in the reel body and extending tangentially of the rotary member 17. The guide member 33 is biased toward a position adjacent the rotary member 17 by a spring 35.

When the clutch controller 6 is depressed, an operating force transmitted from the contact pin 6A of the clutch controller 6 through the control member 30 causes the annular cam 28 to rotate to a phase beyond a dead point of the first toggle spring 29. Then the cam surfaces 28A cause the yoke 26 to disengage the clutch sleeve 23 from the pin 22 and maintain this disengaged state.

During this operation to disengage the clutch mechanism C, a hooked free end 32A of the return piece 32 moves with rotation of the annular cam 28, while contacting the guide member 33. Upon reaching a predetermined position, the free end 32A of the return piece 32 separates from the guide member 33. As a result, the free end 32A is shifted toward the rotary member 17 to a position of interference inside a locus of revolution of the projections 17A of the rotary member 17. When the handle 8 is subsequently turned in the line winding direction, its operating force is transmitted through the rotary member 17 and causes the free end 32A of the return piece 32 to contact and move with the guide member 33. When the return piece 32 reaches a position beyond a dead point of the second toggle spring 31, the return piece 32 is separated from the guide member 33 and the annular cam 28 rotates to a phase beyond this dead point. As a result, the clutch mechanism C is engaged under the forces of the first toggle spring 29 and the coil springs 27 mounted on the support shafts 25.

The brake mechanism B is constructed as shown in FIG. 5. This brake mechanism B is a centrifugal type including rods 36 extending radially of the spool shaft 21, and a pair of plastic collars 37 slidably mounted on the rods 37. The brake mechanism B further includes a cylindrical friction member 38 disposed outwardly of a locus of revolution of the collars 37. The friction member 38 is rotatably supported in the left side case 1. A braking piece 39 is provided for contacting and braking rotation of the friction member 38. The braking piece 39 applies a braking force adjustable by a screw type adjusting device 40.

As shown in FIG. 4, the cast controller 9, as does the drag controller 7, includes a plurality of teeth 9A formed on an inner wall thereof to produce a clicking sound with rotation of the cast controller 9. These teeth 9A are engaged with an arcuate sound producing piece 14 formed of a leaf spring and supported by the right side case 1.

According to the present invention, the control mechanism may be a slidable plate type mechanism as in the prior Japanese publication cited in the introductory part hereof. In this case, it is possible to form a return piece integral with the slidable plate. Further, a ratchet wheel may be used as the rotary member.

What is claimed is:

1. A baitcasting reel comprising:
   a reel body, a handle shaft, a spool, a handle connected to said handle shaft, and an output gear mounted on said handle shaft;
   a clutch mechanism for selectively transmitting and preventing the transmission of rotational force between said output gear and said spool, said clutch mechanism being interposed between said output gear and said spool;
   a control mechanism for engaging and disengaging said clutch mechanism;
   a rotary member mounted on said handle shaft, said rotary member including projections;
   a return piece having a first end pivoted to said control mechanism, and a second end for contacting said rotary member; and
   a reciprocatable guide member for contacting said second end of said return piece and for thereby guiding said second end of said return piece, said guide member being attached to said reel body;
   said reel being arranged such that, when said clutch mechanism is disengaged, said guide member prevents said second end of said return piece from coming into contact with said projections of said rotary member, and guides said second end to a predetermined position, and thereafter said second end disengages from said guide member to move radially into a locus of revolution of said projections of said rotary member whereby said second end and said rotary member interfere with each other; and
   wherein, when said handle is operated in a line winding direction, a pressing force is transmitted from said projections to said second end of said return piece such that said return piece and said guide member come into contact with each other and move in unison, to thereby move said control mechanism and engage said clutch mechanism.

2. A baitcasting reel as claimed in claim 1, wherein said clutch mechanism includes an engaging pin attached to an intermediate position of a shaft of said spool, and a clutch sleeve slidably mounted on said spool shaft to be engageable with said engaging pin.

3. A baitcasting reel as claimed in claim 2, wherein said control mechanism comprises an annular cam rotatably and coaxially mounted on said spool shaft and defining a pair of cam surfaces.

4. A baitcasting reel as claimed in claim 3, wherein said return piece is in form of an arm pivotally supported by said annular cam for acting on a toggle spring, said return piece being separable from said guide member upon reaching a position beyond a dead point of said toggle spring, with said annular cam rotatable to a phase beyond said dead point.

5. A baitcasting reel comprising:
   a reel body, a handle shaft, a spool, a handle connected to said handle shaft, and an output gear mounted on said handle shaft;
   a clutch mechanism for selectively transmitting and preventing the transmission of rotational force between said output gear and said spool, said clutch mechanism being interposed between said output gear and said spool;
   a control mechanism for engaging and disengaging said clutch mechanism;
   a rotary member mounted on said handle shaft, said rotary member including projections;
   a return piece having a first end pivoted to said control mechanism, and a second end for contacting said rotary member; and
   a guide member for contacting said second end of said return piece and for thereby guiding said second end of said return piece, and a slot formed in said reel body, said guide member being movable along said slot in a direction tangent to said rotary member, and a resilient member for biasing said guide member;
   said reel being arranged such that, when said clutch mechanism is disengaged, said guide member prevents said second end of said return piece from coming into contact with said projections of said rotary member, and guides said second end to a predetermined position, and thereafter said second end disengages from said guide member to move radially into a locus of revolution of said projections of said rotary member whereby said second end and said rotary member interfere with each other; and
   wherein, when said handle is operated in a line winding direction, a pressing force is transmitted from said projections to said second end of said return piece such that said return piece and said guide member come into contact with each other and move in unison, to thereby move said control mechanism and engage said clutch mechanism.

* * * * *